US009209439B2

United States Patent
Shiraishi et al.

(10) Patent No.: US 9,209,439 B2
(45) Date of Patent: Dec. 8, 2015

(54) ELECTRIC STORAGE DEVICE

(75) Inventors: Yu Shiraishi, Kyoto (JP); Hirokazu Kambayashi, Kyoto (JP); Syun Ito, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 203 days.

(21) Appl. No.: 13/982,741

(22) PCT Filed: Jan. 30, 2012

(86) PCT No.: PCT/JP2012/051979
§ 371 (c)(1),
(2), (4) Date: Jul. 30, 2013

(87) PCT Pub. No.: WO2012/105491
PCT Pub. Date: Aug. 9, 2012

(65) Prior Publication Data
US 2013/0309559 A1    Nov. 21, 2013

(30) Foreign Application Priority Data

Jan. 31, 2011   (JP) ................. 2011-018541

(51) Int. Cl.
*H01M 2/08*        (2006.01)
*H01M 2/30*        (2006.01)
(Continued)

(52) U.S. Cl.
CPC .............. *H01M 2/08* (2013.01); *H01M 2/0473* (2013.01); *H01M 2/06* (2013.01); *H01M 2/30* (2013.01); *H01M 10/0431* (2013.01); *H01M 2/0217* (2013.01); *H01M 2/263* (2013.01)

(58) Field of Classification Search
CPC ... H01M 2/08; H01M 2/0217; H01M 2/0473; H01M 2/06; H01M 2/263; H01M 2/30; H01M 10/0431

See application file for complete search history.

(56) References Cited

U.S. PATENT DOCUMENTS

| 6,579,640 B1 | 6/2003 | Nagase et al. |
| 7,234,979 B2 | 6/2007 | Fujii |

(Continued)

FOREIGN PATENT DOCUMENTS

| JP | 09-147832 A | 6/1997 |
| JP | 2000-311664 A | 11/2000 |

(Continued)

OTHER PUBLICATIONS

English translation of JP Publication 2009-283335, Dec. 2009.*
International Search Report dated May 1, 2012 in PCT/JP2012/051979, with English translation thereof.

*Primary Examiner* — Brittany Raymond
(74) *Attorney, Agent, or Firm* — McGinn IP Law Group, PLLC.

(57) ABSTRACT

An electric storage device includes an outer covering, an external terminal having an exposed face exposed outside from the outer covering, a current collector disposed inside the outer covering and connected to the external terminal, and an electrode assembly disposed inside the outer covering and connected to the current collector. The outer covering has a plurality of protrusions protruding outward. The device further includes gasket which has a main body disposed between the external terminal and the outer covering and a plurality of projecting portions respectively extending from the main body and having insertion holes through which the respective protrusions of the outer covering are inserted. The respective protrusions are joined to the outer covering by swaging after respectively inserted through the insertion holes in the respective projecting portions.

19 Claims, 6 Drawing Sheets

(51) Int. Cl.
*H01M 2/04* (2006.01)
*H01M 2/06* (2006.01)
*H01M 10/04* (2006.01)
*H01M 2/02* (2006.01)
*H01M 2/26* (2006.01)

(56) References Cited

U.S. PATENT DOCUMENTS

2007/0066149 A1  3/2007  Fujii
2010/0173189 A1*  7/2010  Suzuki .......................... 429/158

2012/0264007 A1  10/2012  Sasaki et al.

FOREIGN PATENT DOCUMENTS

| JP | 2001-93485 A | 4/2001 |
| JP | 2003-346778 A | 12/2003 |
| JP | 2005-339990 A | 12/2005 |
| JP | 2007-87616 A | 4/2007 |
| JP | 2009-283335 | * 12/2009 |
| JP | 2009-283335 A | 12/2009 |
| JP | 2009-289611 A | 12/2009 |
| JP | 2010-97822 A | 4/2010 |

* cited by examiner

ELECTRIC STORAGE DEVICE

TECHNICAL FIELD

The present invention relates to an electric storage device including a battery such as a nonaqueous electrolyte secondary battery.

BACKGROUND ART

In a battery such as a nonaqueous electrolyte secondary battery, a positive electrode and a negative electrode of an electrode assembly housed in a battery case are electrically connected to positive and negative external terminals with positive and negative current collectors interposed therebetween, respectively. On an upper face (outer face) of a lid body sealing an upper end opening of the battery case, at least portions of the external terminals are disposed. Between the external terminals and the upper face of the lid body, upper gaskets for insulation are disposed.

In a battery disclosed in Patent Document 1, protrusions protruding upward from an upper face of a lid body are inserted through a portion (projecting portion) of each of upper gaskets, the portion being different from a portion where an external terminal is disposed, to thereby prevent rotation of the upper gasket with respect to the upper face of the lid body.

PRIOR ART DOCUMENT

Patent Document

Patent Document 1: JP-A-2009-283335

SUMMARY OF THE INVENTION

Problems to be Solved by the Invention

The projecting portion provided to each of the upper gaskets described in Patent Document 1 is in a simple plate shape. Provision of such a plate-shaped projecting portion is against demand for weight reduction of the upper gasket and saving of material required for manufacture of the upper gasket. Moreover, in joining the projecting portion by swaging to the lid body by widening tip ends of the protrusions in order to reliably prevent rotation and detachment of the upper gasket from the lid body in manufacture of the electric storage device, the simple plate-shaped projecting portion does not have enough leeway for deformation (escape) in a planar direction in response to compression in a thickness direction. As a result, damage such as clack may be caused to the projecting portion in the joining by swaging. In other words, the simple plate-shaped projecting portion is not suitable for the joining by swaging.

It is an object of the present invention to reliably prevent rotation of gaskets with respect to a lid body while achieving weight reduction and saving of material.

Means for Solving the Problems

According to an aspect of the present invention, there is provided an electric storage device including: an outer covering; an external terminal having an exposed face exposed outside the outer covering; a current collector disposed inside the outer covering and connected to the external terminal; and an electrode assembly disposed inside the outer covering and connected to the current collector, wherein the outer covering has a plurality of protrusions protruding outward, the device further includes a gasket which has a main body disposed between the external terminal and the outer covering and a plurality of projecting portions respectively extending from the main body and having insertion holes through which the respective protrusions of the outer covering are inserted, and the respective protrusions are joined to the outer covering by swaging after respectively inserted through the insertion holes in the respective projecting portions.

The gasket has the main body and the plurality of projecting portions respectively extending from the main body. The protrusions are inserted through the insertion holes in the respective projecting portions and joined to the outer covering by swaging. In other words, because only the projecting portions are formed as portions required for the joining by swaging, it is possible to achieve weight reduction of the gasket and reduction of material required to manufacture the gasket. Moreover, because the plurality of projecting portions separately extend from the main body, it is possible to secure leeway for deformation (escape) in a planar direction in response to compression in a thickness direction of the individual projecting portions in the joining of the protrusions by swaging to thereby reliably prevent damage such as clack to the gasket during the joining by swaging. As a result, the projecting portions can be reliably joined to the lid body by swaging and therefore it is possible to reliably prevent rotation of the gasket with respect to the outer covering and detachment of the gasket from the outer covering during manufacture of the electric storage device.

The projecting portions of the gasket may be formed by the plurality of projecting portions disposed at an interval and to be adjacent to each other and the protrusions of the outer covering may be formed by the plurality of protrusions which can be disposed in the respective projecting portions.

The projecting portions of the gasket may be formed by the plurality of projecting portions at least one of which is disposed on an opposite side of the main body and the protrusions of the outer covering may be formed by the plurality of protrusions which can be disposed in the respective projecting portions.

The protrusion of the outer covering may be formed by integrating a separate member with the outer covering.

The protrusion of the outer covering may be a portion of the outer covering protruding from the outer covering. In this case, the protrusion can be formed easily and at low cost by pressing or the like.

Preferably, the external terminals are formed by a positive electrode terminal and a negative electrode terminal, the protrusions of the outer covering on a positive electrode side and a negative electrode side have different shapes from each other, and the insertion holes formed in the projecting portions of the gasket disposed on each of the positive electrode side and the negative electrode side have such shapes that only the protrusions of a corresponding polarity can be inserted through the insertion holes.

The external terminals may be formed by the positive electrode terminal and the negative electrode terminal and positions of the protrusions of the outer covering on the positive electrode side and the negative electrode side may be displaced from each other.

With the above-described structure, it is possible to reliably prevent attachment of the gaskets and the external terminals on wrong sides of the positive electrode side and the negative electrode side.

According to a second aspect of the invention, there is provided an electric storage device including: an outer covering; an external terminal having an exposed face exposed outside from the outer covering; a current collector disposed inside the outer covering and connected to the external terminal; and an electrode assembly disposed inside the outer covering and connected to the current collector, wherein the external terminals are formed by a positive electrode terminal and a negative electrode terminal, paired bulging portions bulging outward and protrusions formed in vicinities of the respective bulging portions and protruding outward are formed at the outer covering, the device further includes a gasket which has a main body disposed between the external terminal and the outer covering and projecting portions respectively extending from the main body and having insertion holes through which the protrusions of the outer covering are inserted, and the protrusions are joined to the outer covering by swaging after inserted through the insertion holes in the projecting portions.

Preferably, the bulging portions of the outer covering on a positive electrode side and a negative electrode side have different shapes from each other.

With this structure, it is possible to reliably prevent attachment of the gaskets and the external terminals on wrong sides of the positive electrode side and the negative electrode side.

Advantages of the Invention

According to the invention, the gasket has the main body and the plurality of projecting portions respectively extending from the main body. The protrusions are inserted through the insertion holes in the respective projecting portions and joined to the outer covering by swaging. Therefore, it is possible to reliably prevent rotation of the gasket with respect to the outer covering and detachment of the gasket from the outer covering during manufacture of the electric storage device while achieving weight reduction of the gasket and reduction of material required to manufacture the gasket.

MODES FOR CARRYING OUT THE INVENTION

Embodiments of the present invention will be specifically described below with reference to the accompanying drawings.

Figure 1:
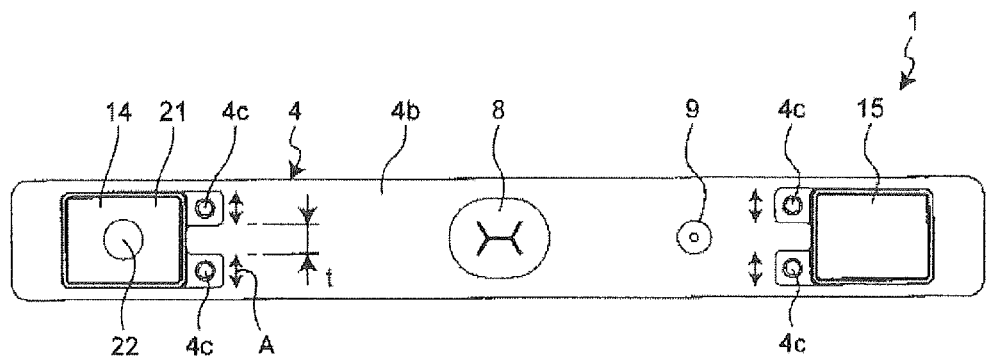
FIG. 1 is a plan view of a battery according to an embodiment of the present invention.
Figure 2:
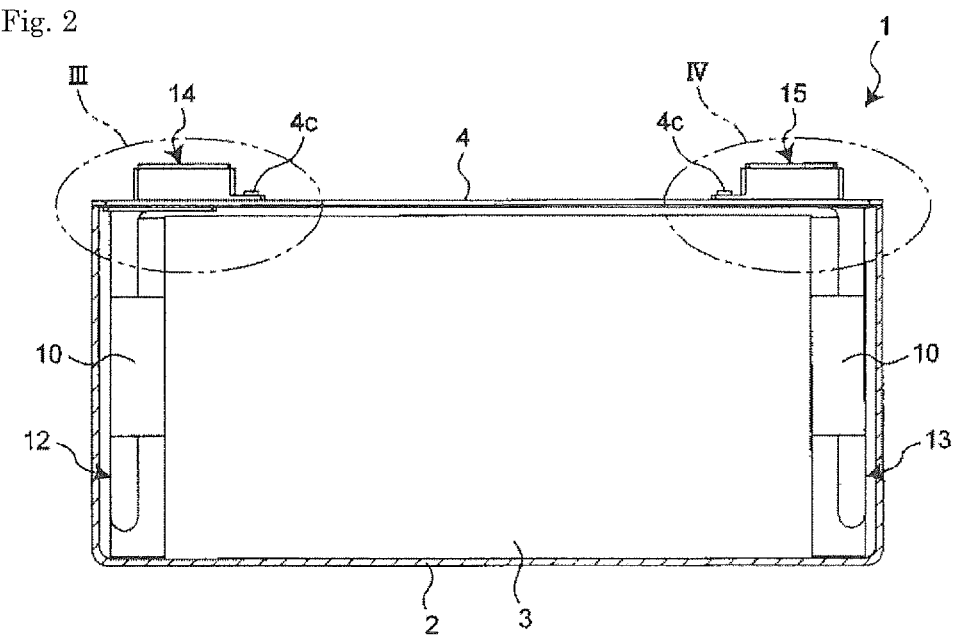
FIG. 2 is a vertical sectional view of the battery according to the embodiment of the invention.
Figure 3:
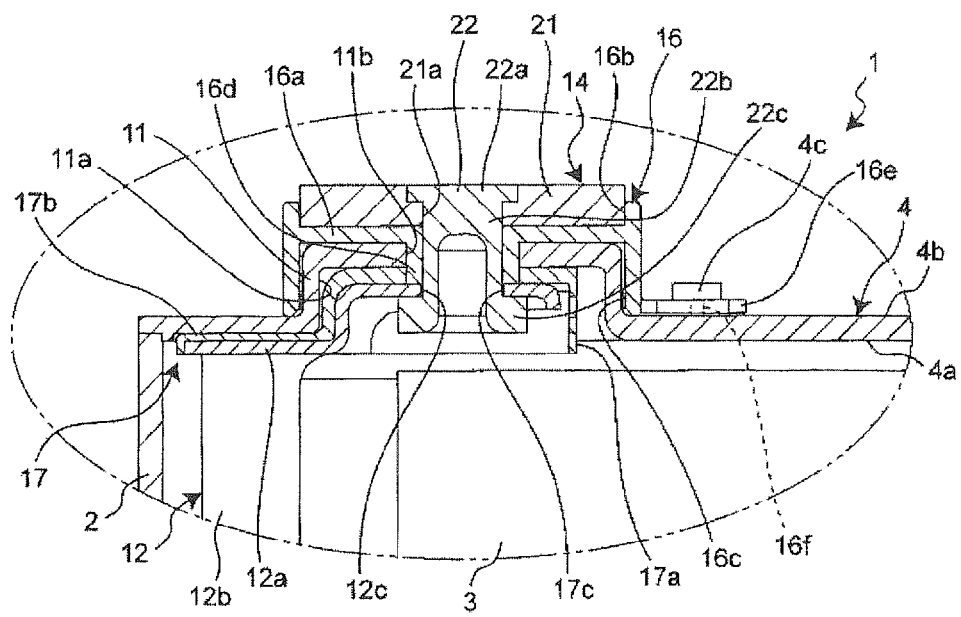
FIG. 3 is an enlarged view of a portion III in FIG. 2.
Figure 4:
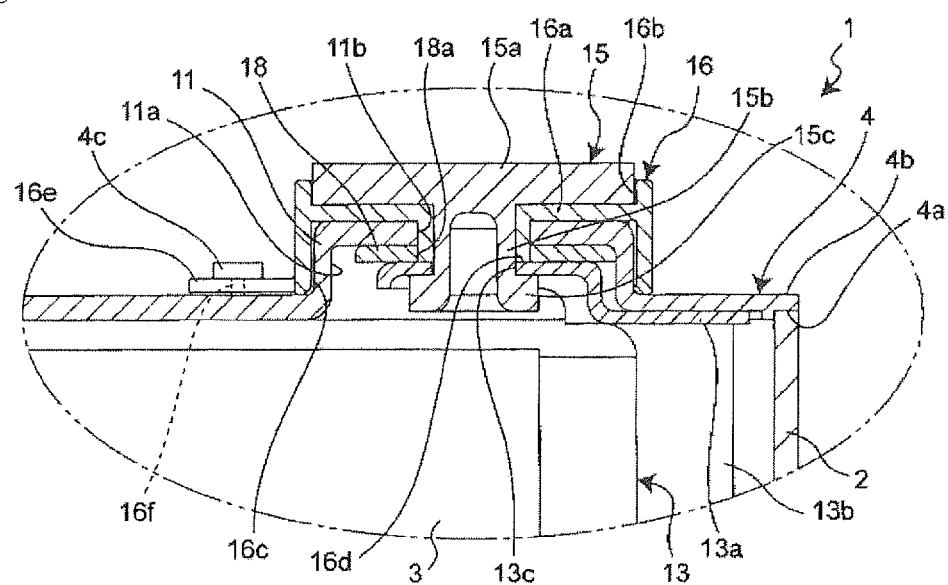
FIG. 4 is an enlarged view of a portion IV in FIG. 2.
Figure 5:
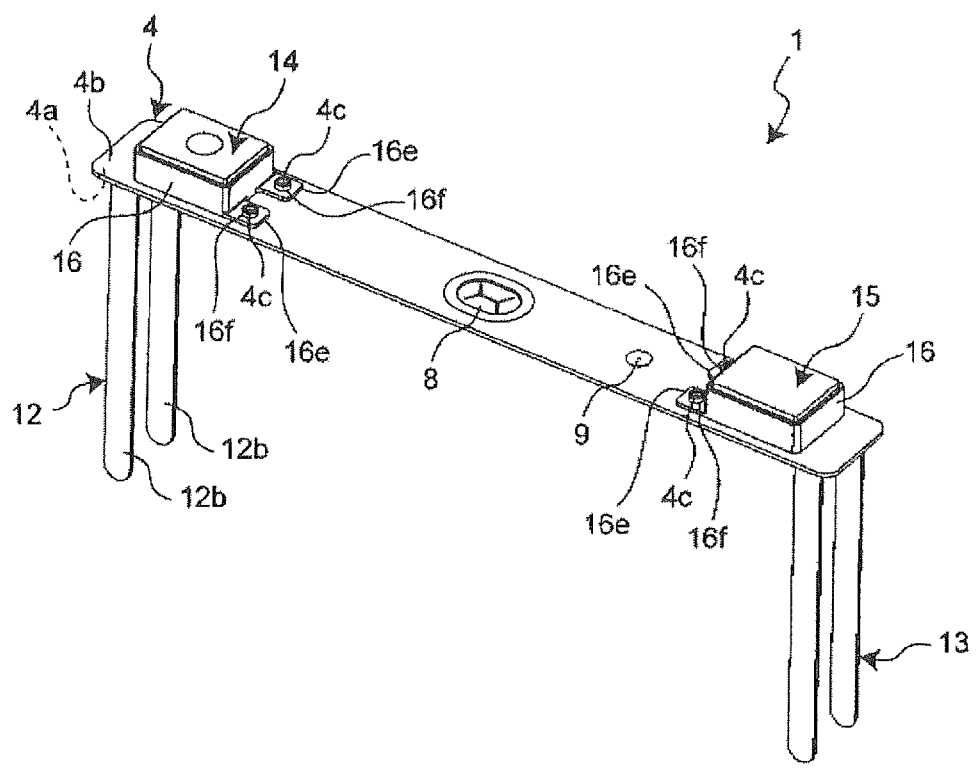
FIG. 5 is a perspective view of a lid body seen from above.
Figure 6:
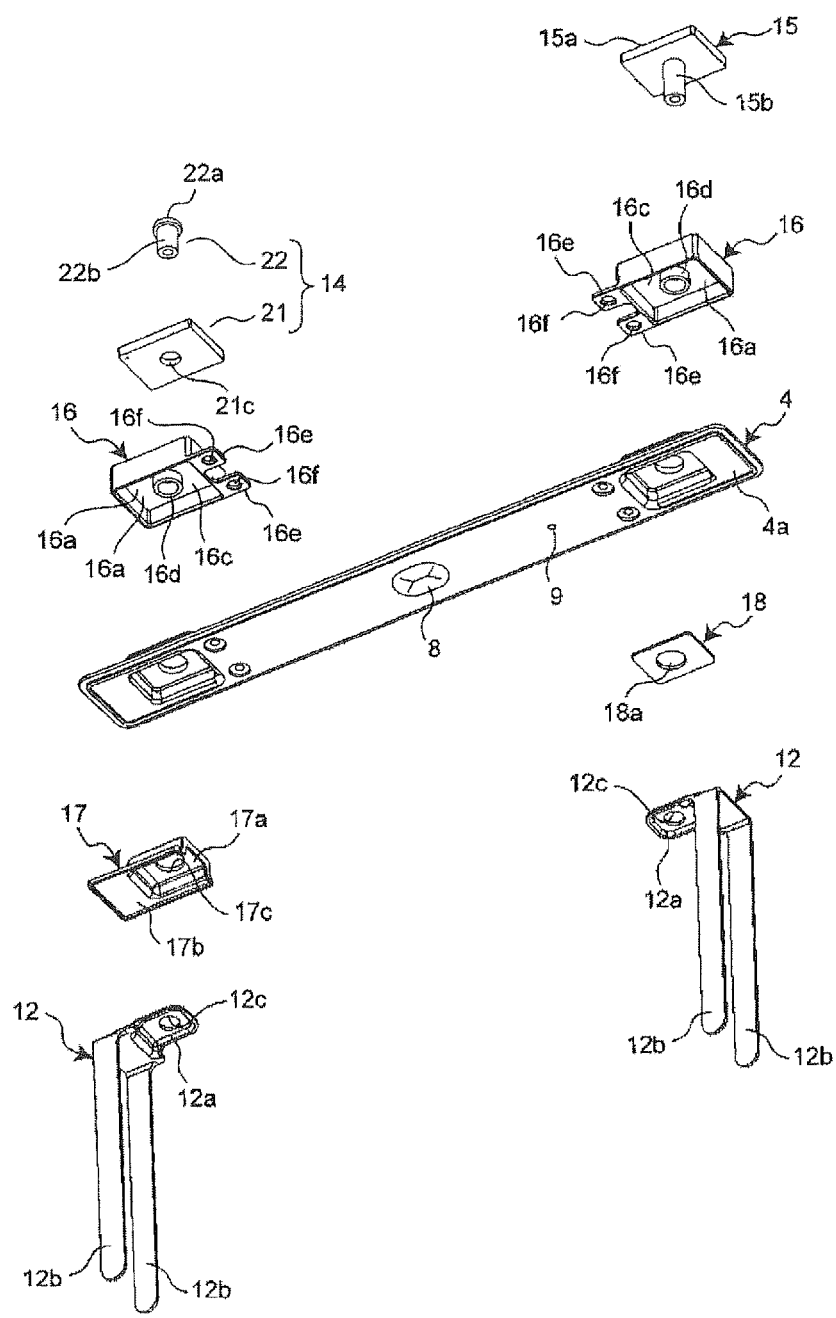
FIG. 6 is an exploded perspective view of the lid body.

FIGS. 1 and 2 show a nonaqueous electrolyte secondary battery 1 (hereafter, simply referred to as "battery") according to the embodiment of the invention. The battery 1 is formed by housing an electrode assembly 3 in a battery case 2 made of aluminum, an aluminum alloy, or the like in a shape of a rectangular parallelepiped and sealing an upper end opening of the battery case 2 with a lid body 4. The battery case 2 and the lid body 4 form an outer covering substantially in a shape of a rectangular parallelepiped. Upper faces of a negative electrode external terminal 14 and a positive electrode external terminal 15 are exposed to an outside of the lid body 4.

The electrode assembly 3 is formed by disposing separators formed by porous resin films between a negative electrode made of copper foil and a positive electrode made of aluminum foil and winding them. The negative electrode of the electrode assembly 3 is electrically connected to the negative electrode external terminal 14 with a negative electrode current collector 12 interposed therebetween. The positive electrode is electrically connected to the positive electrode external terminal 15 with a positive current collector 13 interposed therebetween.

With reference also to FIGS. 3 to 6, the lid body 4 is a long rectangular metal plate in a plan view and has a safety valve 8 attached near a center in a longitudinal direction and an electrolyte solution filling opening 9 provided on one end side.

Engagement receiving portions (bulging portions) 11 in substantially rectangular shapes in a plan view and bulging upward from an upper face 4b are formed respectively at opposite end portions of the lid body 4. At each of the engagement receiving portions 11, a lower face 4a of the lid body 4 is recessed to form an engagement recessed portion 11a. A through hole 11c is formed in a central portion of a ceiling face forming the engagement recessed portion 11a. In a vicinity of the engagement receiving portion 11, paired protrusions 4c protruding from the upper face 4b are respectively formed at an interval along one side (one of opposed sides of the engagement receiving portions 11) of the engagement receiving portion 11. The engagement receiving portions 11, the through holes 11c, and the protrusions 4c can be formed by pressing or the like. In prior art, the protrusions 4c are formed by spot-welding separated members. By integrally forming the protrusions 4c with the lid body 4 by pressing or the like, the number of parts does not increase, the lid body 4 can be manufactured easily and at low cost, and weight does not increase. However, the protrusions 4c may be formed by spot-welding separate members as in the prior art.

In the drawings, the negative electrode current collector 12 and the negative electrode external terminal 14 are attached to the left engagement receiving portion 11 with a negative electrode lower gasket 17 and an upper gasket 16 interposed therebetween, respectively.

The upper gasket 16 is a part made of synthetic resin and partitioned with a partition 16a into an upper terminal retaining recessed portion 16b and a lower attaching recessed portion 16c. A cylindrical portion 16d extending downward and having open opposite ends is formed at a central portion of the partition 16a. The partition 16a, the terminal retaining recessed portion 16b, the attaching recessed portion 16c, and the cylindrical portion 16d form a main body of the upper gasket 16 in the invention. The upper gasket 16 is attached to the lid body 4 by covering the engagement receiving portion 11 from above to house the engagement receiving portion 11 in the attaching recessed portion 16c. The cylindrical portion 16d is inserted through the through hole 11c to enter the engagement recessed portion 11a.

The negative electrode lower gasket 17 includes a swaged portion 17a disposed in the engagement recessed portion 11a in the lid body 4 and a flat portion 17b provided continuously with the swaged portion 17a. A through hole 17c is formed in the swaged portion 17a. Into the through hole 17c, a portion near a lower end of the cylindrical portion 16d of the upper gasket 16 is inserted.

The negative electrode external terminal 14 includes a rectangular aluminum plate-shaped body 21 in a plan view and a copper rivet 22. The rivet 22 is fixed to the plate-shaped body 21 with a shaft portion 22b protruding by press-fitting a jaw portion 22a into a through hole 21a formed in a central portion of the plate-shaped body 21. The plate-shaped body 21 is housed in the terminal retaining recessed portion 16b in the upper gasket 16.

The negative electrode current collector 12 formed by pressing a copper plate material includes a base portion 12a and a pair of leg portions 12b, 12b. A portion of the base portion 12a where a through hole 12c is formed is housed in the engagement recessed portion 11a and disposed to lie under the swaged portion 17a of the negative electrode lower gasket 17. Through the through hole 12c, the shaft portion 22b of the rivet 22 of the negative electrode external terminal 14 is inserted. The leg portions 12b, 12b extend from the base portion 12a and are electrically connected and mechanically coupled to the negative electrode 5 of the electrode assembly 3 by a clip 10 schematically shown only in FIG. 1.

By inserting the shaft portion 22b of the rivet 22 of the negative electrode external terminal 14 through the cylindrical portion 16d of the upper gasket 16 and the through hole 12c in the negative electrode current collector 12 and then widening a tip end of the shaft portion 22b to form a swaged head portion 22c, the negative electrode external terminal 14, the upper gasket 16, the negative electrode lower gasket 17, and the base portion 12a of the negative electrode current collector 12 are joined by swaging to the lid body 4. The base portion 12a of the negative electrode current collector 12 is electrically connected to the plate-shaped body 21 of the negative electrode external terminal 14 with the rivet 22 interposed therebetween.

In the drawings, the positive current collector 13 and the positive electrode external terminal 15 are attached to the engagement receiving portion 11 and the guide recessed portion 11b on the right side with the upper gasket 16 and the positive electrode lower gasket 18 interposed therebetween, respectively.

The upper gasket 16 is attached to the engagement receiving portion 11 similarly to that on the negative electrode side. On the other hand, the positive electrode lower gasket 18 is in a flat plate shape having a through hole 18a and disposed in the engagement recessed portion 11a.

The positive electrode external terminal 15 is made of aluminum and includes a rectangular plate-shaped body 15a in a plan view and a cylindrical shaft portion 15b protruding from a central portion of a lower face of the plate-shaped body 15a. The plate-shaped body 15a is housed in the terminal retaining recessed portion 16b of the upper gasket 16.

The positive current collector 13 formed by pressing an aluminum plate material has a similar structure to the negative electrode current collector 12. A portion of a base portion 13a of the positive current collector 13 where a through hole 13c is formed is housed in the engagement recessed portion 11a and disposed to lie under the positive electrode lower gasket 18. Leg portions 13b, 13b of the positive current collector 13 are electrically connected and mechanically coupled to the positive electrode 6 of the electrode assembly 3 by a clip 10 schematically shown only in FIG. 1.

By inserting the shaft portion 15b of the positive electrode external terminal 15 through the cylindrical portion 16d of the upper gasket 16 and the through hole 13c in the positive electrode current collector 13 and then widening a tip end of the shaft portion 15b to form a swaged head portion 15c, the positive electrode external terminal 28, the upper gasket 16, the positive electrode lower gasket 18, and a swaged portion 33 of the positive electrode current collector 13 are joined by swaging to the lid body 4. The base portion 13a of the positive electrode current collector 13 is electrically connected to the positive electrode external terminal 15 by coming in direct contact with the shaft portion 15b.

A rotation preventing structure for preventing rotation of the upper gaskets 16 on the negative side and the positive side about the shaft portions 15b and 22b on the upper face 4b of the lid body 4 will be described below. The upper gasket 16 is provided, on its side wall, with two tongue-shaped portions (projecting portions) 16e, 16e extending from a vicinity of a lower end opening along the upper face 4b of the lid body 4. The tongue-shaped portions 16e are provided at an interval t to be adjacent to each other. In each of the tongue-shaped portions 16e, an insertion hole 16f is formed to pass through the tongue-shaped portion 16e in a thickness direction. Through the insertion holes 16f, the protrusions 4c protruding from the upper face 4b of the lid body 4 are inserted. By widening tip ends of the protrusions 4c protruding from upper faces of the tongue-shaped portions 16e to form swaged head portions, the tongue-shaped portions 16e of the upper gasket 16 are joined to the lid body 4 by swaging.

Rotation of the upper gasket 16 with respect to the lid body 4 is prevented not by providing a single large plate-shaped portion to the upper gasket 16 and joining a plurality of portions of the plate-shaped portion to the lid body 4 by swaging, for example, but by providing the two tongue-shaped portions 16e formed at the interval t and to be adjacent to each other and individually joining them to the lid body 4 by swaging. In this way, by providing the tongue-shaped portions 16e formed at the interval t and to be adjacent to each other instead of providing the single large plate-shaped portion for preventing rotation, it is possible to achieve weight reduction of the upper gasket 16 and reduction of material required for manufacture of the upper gasket 16.

Because the interval t is provided between the two tongue-shaped portions 16e, it is possible to secure leeway for deformation (escape) in a planar direction in response to compression of the respective tongue-shaped portions 16e in a thickness direction at the time of joining by swaging of the protrusions 4c (directions in which the upper pieces of gasket 16 can be deformed are conceptually shown with arrows A in FIG. 1). By securing the leeway for the deformation in the planar direction, damage such as clack of the upper gasket 16 in the joining by swaging can be prevented reliably. As a result, the tongue-shaped portions 16e can be reliably joined to the lid body 4 by swaging and rotation of the pieces of upper gasket 16 with respect to the lid body 4 can be prevented reliably. Moreover, by reliably joining the tongue-shaped portions 16e to the lid body 4 by swaging, it is possible to reliably prevent detachment of the pieces of upper gasket 16 from the lid body 4 during the manufacture of the electric storage device.

As described above, with the simple structure in which the two tongue-shaped portions 16e are provided at the interval t and to be adjacent to each other and are individually joined to the lid body 4 by swaging, it is possible to reliably prevent rotation of the pieces of upper gasket 16 with respect to the lid body 4 while achieving weight reduction of the pieces of upper gasket 16 and reduction of the material required for manufacture of the pieces of upper gasket 16.

The invention is not restricted to the structure described in the embodiment but can be changed in various ways.

Figure 7:
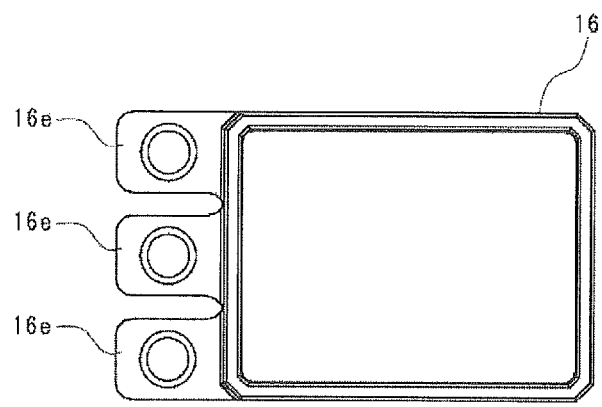
FIG. 7 is a plan view of an upper gasket on a positive electrode side of a battery according to another embodiment of the invention.
Figure 8:
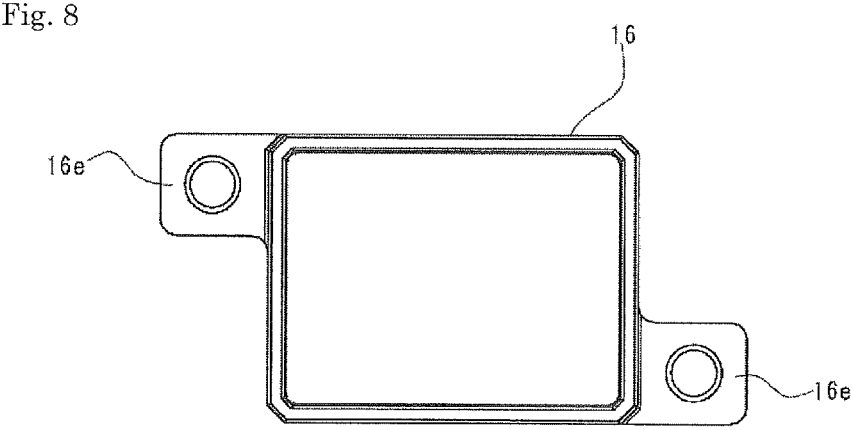
FIG. 8 is a plan view of an upper gasket on a positive electrode side of a battery according to yet another embodiment of the invention.

For example, although the two tongue-shaped portions 16e are formed on one of the side walls substantially in a shape of a quadratic prism of the upper gasket 16 in the above-described embodiment, three or more tongue-shaped portions 16e may be provided, if they are provided at intervals (three are provided in FIG. 7). The intervals can be set freely and can be different from each other. Arrangement of the plurality of tongue-shaped portions 16e is not especially restricted. The tongue-shaped portions 16e do not necessarily have to protrude from only one side wall. For example, as shown in FIG. 8, the tongue-shaped portions 16e may protrude from opposite side walls. In FIG. 8, by disposing the respective tongue-shaped portions 16e at diagonally opposed corners, the rotation preventing effect is further effectively exerted.

Although the tongue-shaped portions 16e as projecting portions are in substantially square shapes in the above-described embodiment, the projecting portions in different shapes such as rectangular shapes and oval shapes may be employed as well.

Although the external terminals 14 and 15 are provided to the lid body 4 in the above-described embodiment, the external terminals 14 and 15 may be provided not to the lid body 4 but to the battery case 2.

Figure 9:
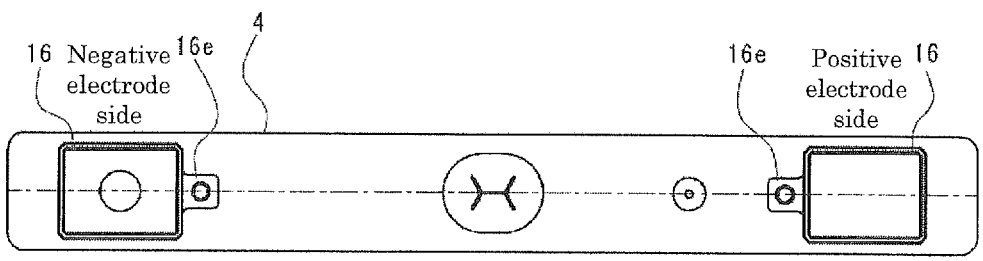
FIG. 9 is a plan view of a battery according to yet another embodiment of the invention.

Although the rotation of the upper gasket 16 is prevented by joining the respective protrusions 4c to the paired tongue-shaped portions (projecting portions) 16e, 16e by swaging in the above-described embodiment, one tongue-shaped portion 16e may be provided and the attaching recessed portion 16c to be engaged with the engagement receiving portion 11 may have rotation preventing effect as shown in FIG. 9.

Figure 10:
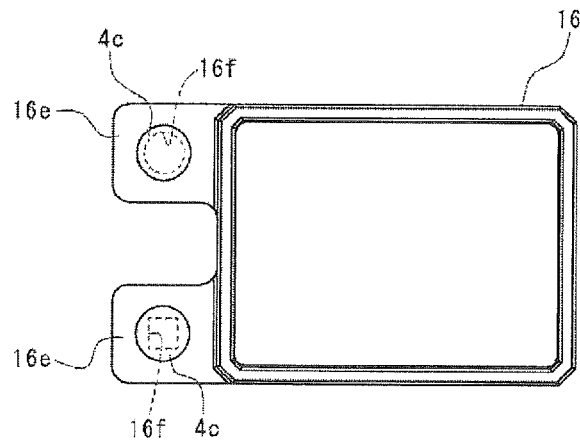
FIG. 10 is a plan view of an upper gasket on a positive electrode side of a battery according to yet another embodiment of the invention.

Although sectional shapes (and sizes) of the protrusions 4c on the positive electrode side and the negative electrode side are the same in the above-described embodiment, they are preferably different from each other. For example, as shown in FIG. 10, protrusions 4c on a positive electrode side and a negative electrode side may have different sectional shapes, i.e., squares and circles (In FIG. 10, upper end portions of the protrusions 4c are swaged and deformed into circles. Dotted lines show original shapes and shapes of insertion holes 16f.) and the insertion holes 16f having sectional shapes corresponding to the shapes may be formed in tongue-shaped portions 16e of pieces of upper gasket 16. In this way, it is possible to reliably prevent attachment of the pieces of upper gasket 16 and external terminals 14 and 15 on wrong sides of the positive electrode side and the negative electrode side by mistake.

Figure 11:
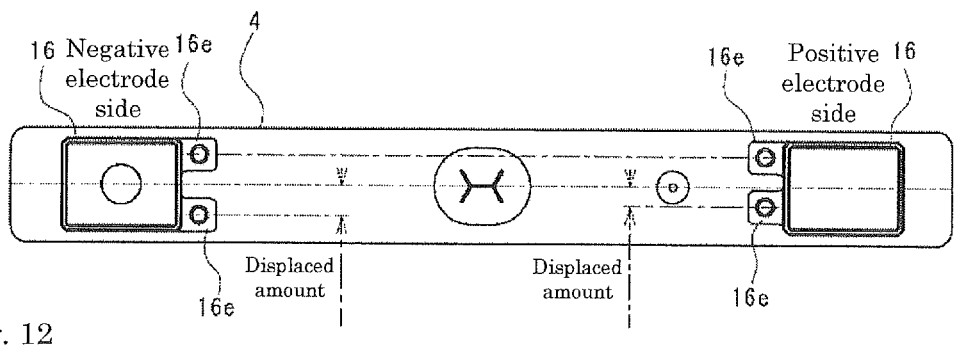
FIG. 11 is a plan view of a battery according to yet another embodiment of the invention.
Figure 12:
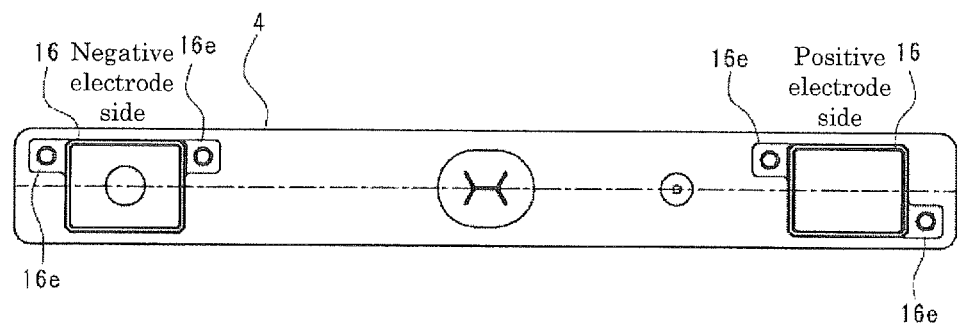
FIG. 12 is a plan view of a battery according to yet another embodiment of the invention.

Instead of forming the protrusions 4c on the positive electrode side and the negative electrode side with the different sectional shapes, the protrusions 4c may be formed in different (displaced) positions. For example, as shown in FIG. 11, displaced amounts of protrusions 4c from a center line of a lid body 4 in a width direction on a positive electrode side and a negative electrode side may be different from each other. As shown in FIG. 12, protrusions 4c may be formed on opposite sides of each of engagement receiving portions 11 and positions of the protrusions 4c in a width direction on a positive electrode side and a negative electrode side may be different from each other. By changing positions where tongue-shaped portions 16e of pieces of upper gasket 16 are formed according to the positions where the respective protrusions 4c are formed, attachment of the pieces of upper gasket 16 on wrong sides of the positive electrode side and the negative electrode side by mistake can be prevented.

Figure 13:
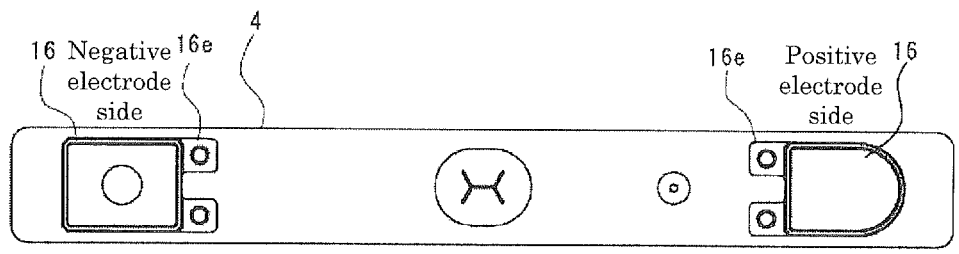
FIG. 13 is a plan view of a battery according to yet another embodiment of the invention.

Instead of forming the protrusions 4c on the positive electrode side and the negative electrode side with the different sectional shapes from each other, shapes of engagement receiving portions 11 on the positive electrode side and the negative electrode side of the lid body 4 may be different from each other. Attaching recessed portions 16c of the respective pieces of upper gasket 16 to be attached to the engagement receiving portions 11 may be in shapes corresponding to the shapes of the engagement receiving portions 11. Although the respective engagement receiving portions 11 are in the same substantially rectangular shapes in the plan view in the above-described embodiment, one end side of one of engagement receiving portions 11 may be formed in a substantially arc shape in a plan view and an attaching recessed portion 16c of upper gasket 16 may be in a corresponding shape, for example, as shown in FIG. 13.

Although structures of the pieces of upper gasket 16 have been described in the above-described embodiment, the structures may be applied to the pieces of lower gasket disposed between the external terminals 14 and 15 and the battery case 2.

DESCRIPTION OF SIGNS 1 nonaqueous electrolyte secondary battery
2 battery case
3 electrode assembly
4 lid body
4a lower face
4b upper face
4c protrusion
8 safety valve
9 electrolyte solution filling opening
10 clip
11 engagement receiving portion
11a engagement recessed portion
11b through hole
12 negative electrode current collector
12a base portion
12b leg portion
12c through hole
13 positive electrode current collector
13a base portion
13b leg portion
13c through hole
14 negative electrode external terminal
15 positive electrode external terminal
15a plate-shaped body
15b shaft portion
15c swaged head portion
16 upper gasket
16a partition
16b terminal retaining recessed portion
16c attaching recessed portion
16d cylindrical portion
16e tongue-shaped portion
16f insertion hole
17 negative electrode lower gasket 17a swaged portion
17b flat portion
17c through hole
18 positive electrode lower gasket
18a through hole
21 plate-shaped body
21a through hole
22 rivet
22a jaw portion
22b shaft portion
22c swaged head portion
t interval

The invention claimed is:

1. An electric storage device, comprising:
an outer covering;
an external terminal that includes a plate-like body including an upper face exposed outside from the outer covering and a shaft section projected from a lower face of the plate-like body;
a current collector disposed inside the outer covering and connected to the external terminal; and
an electrode assembly disposed inside the outer covering and connected to the current collector,
wherein the outer covering includes a plurality of protrusions protruding outward,
wherein the device further includes a gasket which includes a main body disposed between the plate-like body and the outer covering and a plurality of projecting portions, the projecting portions extending from the main body and including insertion holes through which respective protrusions of the outer covering are inserted,
wherein the respective protrusions are swaged after respectively inserted through the insertion holes in the respective projecting portions,
wherein the projecting portions comprise tongue-shaped portions extending from a vicinity of a lower end of a side wall of the main body along the outer covering, and
wherein, in a plan view, a width of the tongue-shaped portions is narrower than a width of the side wall.

2. The electric storage device according to claim 1, wherein the projecting portions of the gasket comprise the plurality of projecting portions disposed at (an) interval(s) and to be adjacent to each other, and
wherein the protrusions of the outer covering comprise the plurality of protrusions which are configured to be disposed in the respective projecting portions.

3. The electric storage device according to claim 1, wherein the projecting portions of the gasket comprise the plurality of projecting portions at least one of which is disposed on an opposite side of the main body, and
wherein the protrusions of the outer covering comprise the plurality of protrusions which are configured to be disposed in the respective projecting portions.

4. The electric storage device according to claim 1, wherein the protrusions of the outer covering comprise a separate member integrated with the outer covering.

5. The electric storage device according to claim 1, wherein each of the protrusions of the outer covering comprises a portion of the outer covering protruding from the outer covering.

6. The electric storage device according to claim 1, wherein the external terminal comprises a positive electrode terminal and a negative electrode terminal,
wherein the protrusions of the outer covering on a positive electrode side and a negative electrode side have different shapes from each other, and
wherein the insertion holes formed in the projecting portions of the gasket disposed on each of the positive electrode side and the negative electrode side have such shapes that only the protrusions of a corresponding polarity are configured to be inserted through the insertion holes.

7. The electric storage device according to claim 1, wherein the external terminal comprises a positive electrode terminal and a negative electrode terminal, and
wherein positions of the protrusions of the outer covering on a positive electrode side and a negative electrode side are displaced from each other.

8. The electric storage device according to claim 1, wherein the width of the tongue-shaped portions is less than the width of the side wall in the plan view viewed in a direction perpendicular to an upper face of the outer covering from which the protrusions protrude outward.

9. The electric storage device according to claim 1, wherein paired bulging portions bulging outward and the protrusions located in vicinities of respective bulging portions are located at the outer covering.

10. The electric storage device according to claim 9, wherein the bulging portions of the outer covering on a positive electrode side and a negative electrode side have different shapes from each other.

11. An electric storage device, comprising:
an outer covering;
an external terminal that includes a plate-like body including an upper face exposed outside from the outer covering and a shaft section projected from a lower face of the plate-like body;
a current collector disposed inside the outer covering and connected to the external terminal; and
an electrode assembly disposed inside the outer covering and connected to the current collector,
wherein the external terminal comprises a positive electrode terminal and a negative electrode terminal,
wherein paired bulging portions bulging outward and protrusions formed in vicinities of respective bulging portions and protruding outward are formed at the outer covering,
wherein the device further includes a gasket which includes a main body disposed between the plate-like body and the outer covering and projecting portions respectively extending from the main body and including insertion holes through which the protrusions of the outer covering are inserted,
wherein the protrusions are swaged after inserted through the insertion holes in the projecting portions,
wherein the projecting portions comprise tongue-shaped portions extending from a vicinity of a lower end of a side wall of the main body along the outer covering, and
wherein, in a plan view, a width of the tongue-shaped portions is narrower than a width of the side wall.

12. The electric storage device according to claim 11, wherein the bulging portions of the outer covering on a positive electrode side and a negative electrode side have different shapes from each other.

13. The electric storage device according to claim 11, wherein the width of the tongue-shaped portions is less than the width of the side wall in the plan view viewed in a direction perpendicular to an upper face of the outer covering from which the protrusions protrude outward.

14. An electric storage device, comprising:
an outer covering that includes an upper face from which a protrusion projects;

an external terminal that includes a plate-like body and a shaft section, the plate-like body including an upper face exposed from the outer covering, the shaft section being projected from a lower face of the plate-like body;
a current collector disposed inside the outer covering and connected to the external terminal;
an electrode assembly disposed inside the outer covering and connected to the current collector; and
a gasket that includes a main body and a projecting portion, the main body being disposed between the plate-like body and the upper face of the outer covering, the main body having a side wall, the projecting portion extending from a vicinity of a lower end of the side wall, the projecting portion having an insertion hole in which the protrusion of the outer covering is inserted, the projecting portion having a width that is narrower than a width of the side wall in a plan view viewed in a direction perpendicular to the upper face.

15. The electric storage device according to claim 14, wherein, in the plan view, the protrusion inserted in the insertion hole is exposed from the gasket.

16. The electric storage device according to claim 14, wherein the main body of the gasket has substantially a same height, which is a dimension in the direction perpendicular to the upper face.

17. The electric storage device according to claim 14, wherein, in the plan view, the main body is exposed from the plate-like body.

18. The electric storage device according to claim 17, wherein, in the plan view, the side wall of the main body is located apart from an edge of the plate-like body.

19. The electric storage device according to claim 14, wherein a bulging portion bulging outward and the protrusion located in vicinities of the bulging portion are located at the outer covering.

\* \* \* \* \*